(12) United States Patent
Bruck et al.

(10) Patent No.: US 12,378,977 B2
(45) Date of Patent: Aug. 5, 2025

(54) VALVE FOR PROVIDING A FLUID-CONDUCTING CONNECTION BETWEEN A PRESSURE SUPPLY PORT AND A CONSUMER PORT OR BETWEEN THE CONSUMER PORT AND A RETURN PORT

(71) Applicant: HYDAC Fluidtechnik GmbH, Sulzbach / Saar (DE)

(72) Inventors: Peter Bruck, Althornbach (DE); Benjamin Röder, Saarbrüken (DE); Markus Bill, Eppelborn (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 18/568,969

(22) PCT Filed: Jun. 7, 2022

(86) PCT No.: PCT/EP2022/065351
§ 371 (c)(1),
(2) Date: Dec. 11, 2023

(87) PCT Pub. No.: WO2022/258589
PCT Pub. Date: Dec. 15, 2022

(65) Prior Publication Data
US 2024/0271642 A1  Aug. 15, 2024

(30) Foreign Application Priority Data
Jun. 12, 2021 (DE) .................... 10 2021 003 039.7

(51) Int. Cl.
*F16K 11/07* (2006.01)
*F15B 13/044* (2006.01)

(52) U.S. Cl.
CPC ........ *F15B 13/044* (2013.01); *F16K 11/0708* (2013.01); *F16K 11/0716* (2013.01)

(58) Field of Classification Search
CPC .. F16K 11/0716; F16K 11/0708; F16K 39/04; F15B 13/044
See application file for complete search history.

(56) References Cited

U.S. PATENT DOCUMENTS 2,953,162 A * 9/1960 Ainsworth .............. F16K 39/04
137/625.12
2,964,023 A * 12/1960 Meulendyk ............. F16K 39/04
137/625.68

(Continued)

OTHER PUBLICATIONS

Search Report for International Application No. PCT/EP2022/065351, 4 pages, Sep. 27, 2022.

*Primary Examiner* — Kelsey E Cary
(74) *Attorney, Agent, or Firm* — Slayden Grubert Beard PLLC (57) ABSTRACT

The invention relates to a valve, in particular a proportional pressure regulating valve, comprising a valve housing (10) and a valve piston (12) which is arranged in the valve housing in a longitudinal a movable manner and which can be actuated by means of an actuation magnet (14) so as to produce either a fluidic connection between a pressure supply connection (P) and a load connection (A) or between the load connection (A) and a return connection (T) in the valve housing (10), wherein the valve piston (12) is permanently fluidically connected to the return connection (T) at the opposing end faces (44, 46) of the valve piston. The invention is characterized in that the valve piston (12) has a pressure-active measuring surface (50) in the region of the load connection (A), said pressure-active measuring surface providing the respective fluid pressure at the load connection (A) as a counterforce to the actuation force of the actuation magnet (14) when the actuation magnet (14) is energized in order to produce a fluidic connection between the pressure supply connection (P) and the load connection (A).

18 Claims, 4 Drawing Sheets

(56) References Cited

U.S. PATENT DOCUMENTS

| | | | |
|---|---|---|---|
| 9,453,518 B2 | 9/2016 | Schulz | ................ F15B 13/043 |
| 2014/0007964 A1* | 1/2014 | Schulz | ............... G05D 16/2024 |
| | | | 251/30.01 |
| 2016/0169402 A1 | 6/2016 | Hilzendegen | ....... F16K 31/0613 |
| 2018/0163889 A1* | 6/2018 | Bruck | ................ F15B 13/0442 |

* cited by examiner

VALVE FOR PROVIDING A FLUID-CONDUCTING CONNECTION BETWEEN A PRESSURE SUPPLY PORT AND A CONSUMER PORT OR BETWEEN THE CONSUMER PORT AND A RETURN PORT

CROSS-REFERENCE TO RELATED APPLICATIONS

This application claims priority to German Patent Application No. DE 10 2021 003 039.7, filed on Jun. 12, 2021 with the German Patent and Trademark Office. The contents of the aforesaid Patent Application are incorporated herein for all purposes.

TECHNICAL FIELD

The disclosure relates to a valve, in particular a proportional pressure reducing valve, having a valve housing and a valve piston, which is arranged therein so as to be longitudinally movable and which can be actuated by means of an actuating solenoid to produce either a fluid-conducting connection between a pressure supply port and a consumer port or between this consumer port and a return port in the valve housing, the valve piston being permanently connected to the return port on its opposing end faces in a fluid-conducting manner.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

One proportional pressure reducing valve, in particular for hydraulically controllable clutches, can be ordered and purchased from the applicant/proprietor under catalogue number PDMC05S30A-50. This is a direct-acting proportional pressure reducing valve, having a valve housing and a valve piston, which is arranged therein so as to be longitudinally movable and which can be actuated in turn by means of an actuating solenoid to produce either a fluid-conducting connection between a pressure supply port and a consumer port or between this consumer port and a tank or return port in the valve housing, the valve piston being permanently connected to the return port on its opposing end faces in a fluid-conducting manner. Viewed in ascending order towards the actuating solenoid, the tank or return port is arranged first on the end face in the valve housing, following in turn from this the consumer port is installed in the radial direction, and again following in the radial direction is the pressure supply port in the form of at least one transverse drilled hole, regularly in the form of a pump supply port. Furthermore, a longitudinal drilled hole with a relatively small diameter is additionally incorporated in the valve housing in the axial direction, which diameter permanently connects a valve chamber, above the pressure supply port and opening towards the valve piston, in a fluid-conducting manner to the consumer port which can consist of a plurality of drilled holes of a row of drilled holes. In the region of the valve chamber, the valve piston has a small change in diameter and in this respect the resulting annular surface forms a pressure-active measuring surface on the valve piston because the opposing end faces of the valve piston are permanently connected to the tank or return port via a central drilled hole as the fluid-conducting connection.

The control pressure occurring during operation then acts in this respect against the said annular or measuring surface and causes an axial force which counteracts a magnetic force of the actuating solenoid in the energised state. Thus, the control pressure can be changed proportionally depending on the magnetic force applied in each case. If the control pressure is less than the magnetic force, the piston moves towards the return or tank port and in this respect opens a fluid connection from the pressure supply port towards the consumer port. If, on the other hand, the pressure is too high, the valve piston moves in the opposite direction and a fluid-conducting connection is created from the consumer port to the tank or return port. The solution thus known has proven extremely successful in practice; however, the production of the longitudinal drilled hole, which is small in cross-section, requires a relatively long machining time and is therefore cost-intensive to produce.

SUMMARY

A need exists to provide a cost-effective way of producing a valve in a functionally reliable design. The need is addressed by the subject matter of the independent claim(s). Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a valve piston of a valve has a pressure-active measuring surface in the region of the consumer port which, when the actuating solenoid is energized, compares the fluid pressure prevailing in each case at the consumer port as a counterforce to the actuating force of the actuating solenoid in order to establish a fluid-conducting connection between the pressure supply port and the consumer port, the above-mentioned change in diameter in the region of the rear valve chamber of the valve piston is now shifted directly to the position of the consumer port, so that in this respect it is possible to dispense completely with the longitudinal drilled hole in the valve housing, which is costly to produce.

The valve concept addressed here is able to switch quickly during a cold start at a viscosity of more than 2,000 cST and in this respect, by eliminating the long throttling point in the form of the longitudinal drilled hole, the cold start behaviour for the valve improves. Furthermore, with the omission of the longitudinal drilled hole, which is kept small in diameter, the diameter of the valve piston itself can be significantly increased so that in such a way the flow resistance of the oil is considerably reduced without increasing the installation space necessary for the valve or the valve piston.

The solution discussed herein implements a directly controlled proportional pressure reducing valve which, when used for hydraulically controlled clutches, makes it possible to generate very large opening cross-sections when the clutch is released in a cost-effective and functionally reliable manner, and thus to ensure rapid disconnection of the clutch without the need for very large and expensive actuating devices in the form of actuating solenoids in addition to valves with large flow cross-sections. However, use of the valve is not limited to clutch applications. Further beneficial configurations of the valve are the subject matter of the dependent claims.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

Figure 1:
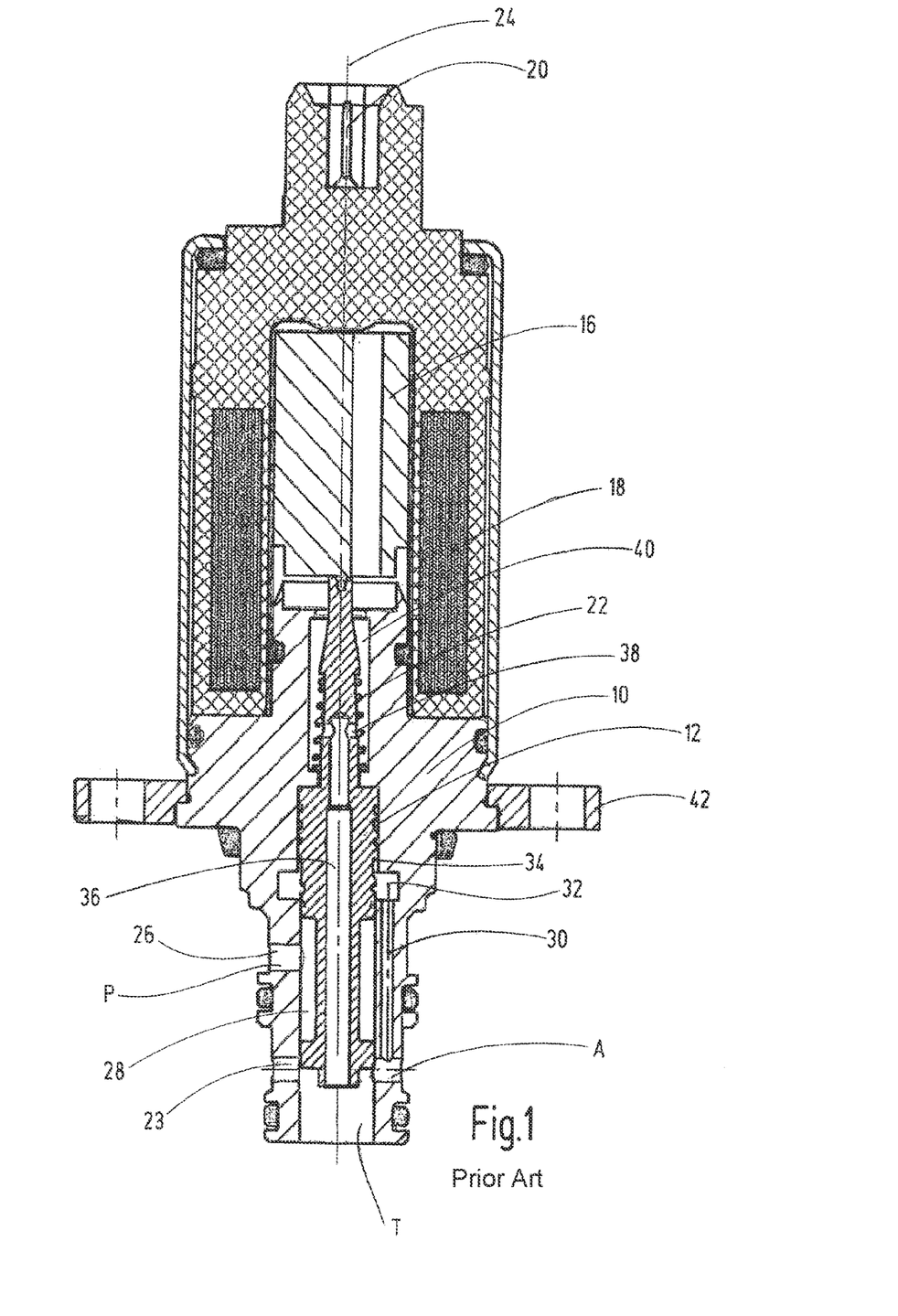
FIG. 1 shows a prior art proportional pressure regulator.

The proportional pressure reducing valve shown in FIG. 1 can be purchased from the applicant/proprietor as a catalogue item under order no. PDMC05S30A-50. A large number of these valves are being used by customers, particularly in the context of operating hydraulically controlled clutches. The solution comprises a valve housing 10 with a valve piston 12 arranged therein so as to be longitudinally movable, which can be actuated by means of an energizable actuating solenoid 14. In the usual design (DE 10 2013 014 558 A1), the actuating solenoid 14 comprises an actuatable solenoid armature 16 as well as an electric coil bobbin 18 which can be energised by means of a plug connector part 20. If the actuating solenoid 14 is energised via the coil bobbin 18, the solenoid armature 16, viewed in the direction of FIG. 1, moves downwards from its neutral position shown in FIG. 1 to an actuating position and at the same time takes with it the valve piston 12 in contact with it in the same actuating direction, against the action of an energy accumulator in the form of a compression spring 22. If no current is applied, the compression spring 22 mentioned returns the solenoid armature 16 to its initial position according to FIG. 1. In this non-actuated position, a consumer port A in the valve housing 10 is connected to a tank or return port T in a fluid-conducting manner. This tank or return port T is incorporated into the valve housing 10 on the face end, whereas the consumer port A is formed from a row of drilled holes 23 with at least two radial transverse drilled holes which open into the valve housing 10 transverse to the longitudinal or actuating axis 24 of the valve. In the embodiment shown according to FIG. 1, at least two, but for example six, transverse drilled holes which, arranged radially transverse to the longitudinal axis 24 of the valve, pass through the valve housing 10, are part of the row of drilled holes 23.

Viewed in the direction of FIG. 1, at least one further transverse drilled hole 26 is incorporated above it, which forms a pressure supply port P and is connected to a pressure source, such as a hydraulic pump which is not shown in greater detail. The consumer port A, on the other hand, is connected to a hydraulic consumer, such as a hydraulically actuatable clutch device (not shown). The corresponding connection structure is common, with the result that it will not be discussed in greater detail at this point.

In addition, the valve piston 12 has a cylindrical recess 28 on the outer circumference, the axial length of which is dimensioned in such a manner that when the actuating solenoid 14 is energised, the solenoid armature 16 drives the valve piston 12 downwards in such a manner that a fluid-conducting connection is created between the pressure supply port P and the consumer port A while simultaneously shutting off both of the aforementioned ports P, A with respect to the tank or return port T.

As also emerges from FIG. 1, on the right-hand side there is a longitudinal drilled hole 30 which permanently connects the consumer port A to an annular valve chamber 32 in a pressure and fluid-conducting manner, which valve chamber opens out towards the valve piston 12, the valve piston 12 being reduced in diameter in this region and to this extent forming an annular surface 34 as a so-called measuring surface or pressure-active surface. This longitudinal drilled hole 30 is small in diameter for space-saving reasons and opens out into one of the transverse drilled holes of the row of holes 23 viewed in the axial direction.

Furthermore, a longitudinal drilled hole 36 is incorporated in the valve piston 12 coaxial with the longitudinal axis 24, which opens out into the tank or return port T on the lower free end face and into a transverse drilled hole 38 in the valve piston 12 on the opposing face, which transverse drilled hole is overlapped by the compression spring 22. This transverse drilled hole 38 discharges into a spring chamber 40 through which the valve piston 12 passes and which accommodates the compression spring 22, one free lower end of which is supported in the region of the chamber 40 on a shoulder of the valve housing 10 and on the opposing side on a shoulder-like widening on the valve piston 12.

The valve is designed as an insert valve solution for a valve block not shown in greater detail and has a locating plate 42 in the manner of a connecting flange for this purpose. The control pressure can now be directed into the valve chamber 32 above the pressure supply port P via the consumer port A and the longitudinal drilled hole 30 which is small in diameter. As already mentioned, the valve piston 12 has a small change in diameter there and in this respect the annular surface 34 resulting therefrom forms a pressure-active measuring surface on the valve piston 12 which furthermore is permanently connected with its opposing end faces top and bottom to the tank or return port T via the longitudinal drilled hole 36.

The control pressure mentioned acts in this respect against this annular or measuring surface 34, thereby causing an axial force which counteracts the magnetic force of the actuating solenoid 14 in the energised state. Thus, the control pressure can be changed proportionally depending on the magnetic force applied in each case. That is, if the control pressure is less than the magnetic force, then the valve piston moves downwards and opens the flow of fluid from the pressure supply port P to the consumer port A via the cylindrical recess 28 on the valve piston 12. If, on the other hand, the control pressure is too high, the valve piston 12 moves upwards and a pressure-relieving flow of fluid is created from the consumer port A to the return or tank port T.

Figure 2:
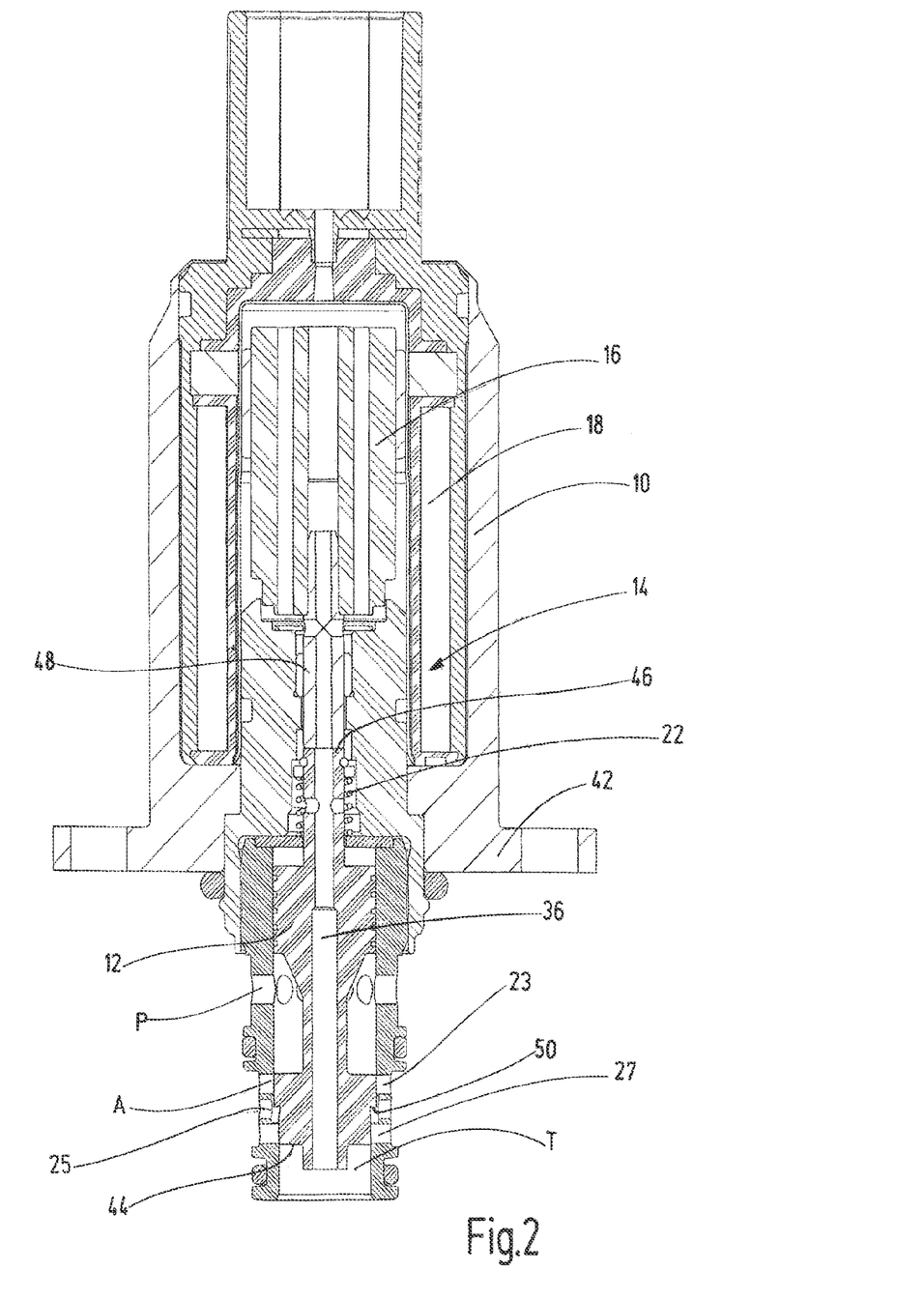
FIGS. 2 to 4 show an example valve in various switching or operating positions.
Figure 3:
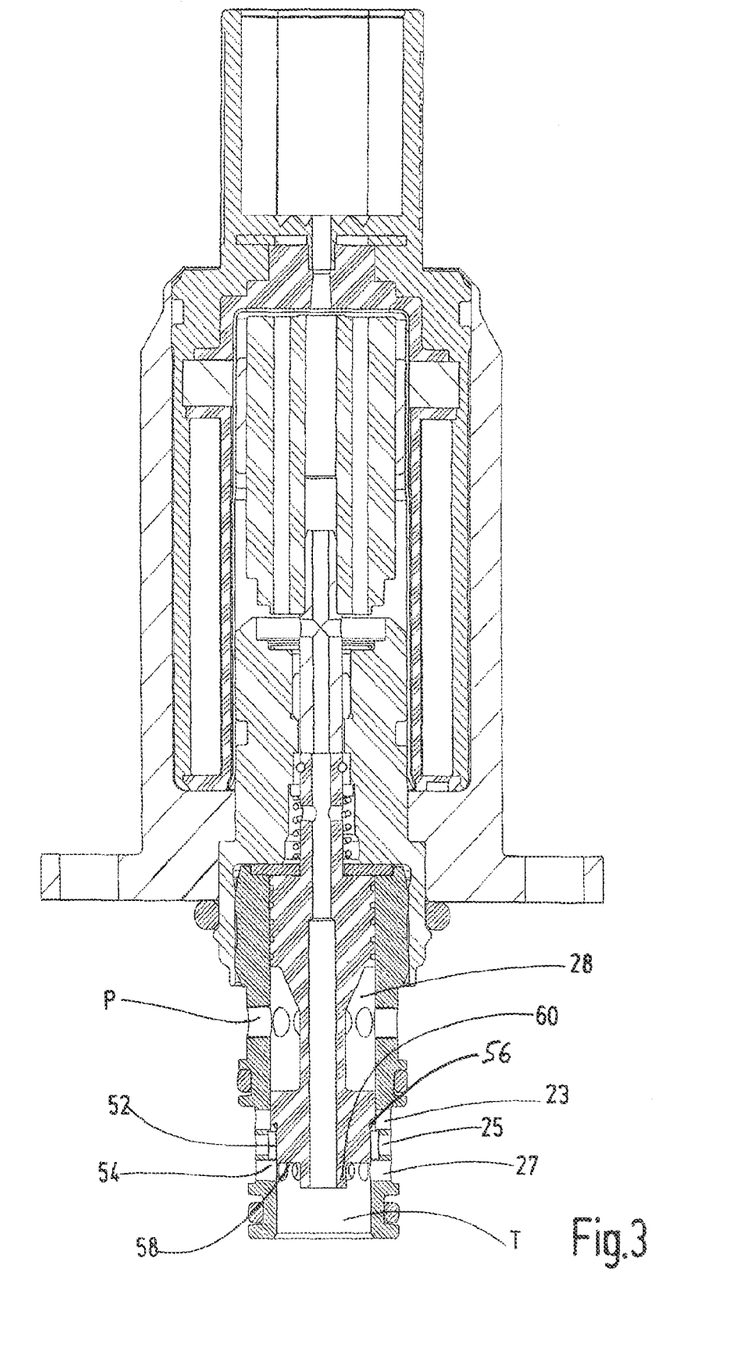
Figure 4:
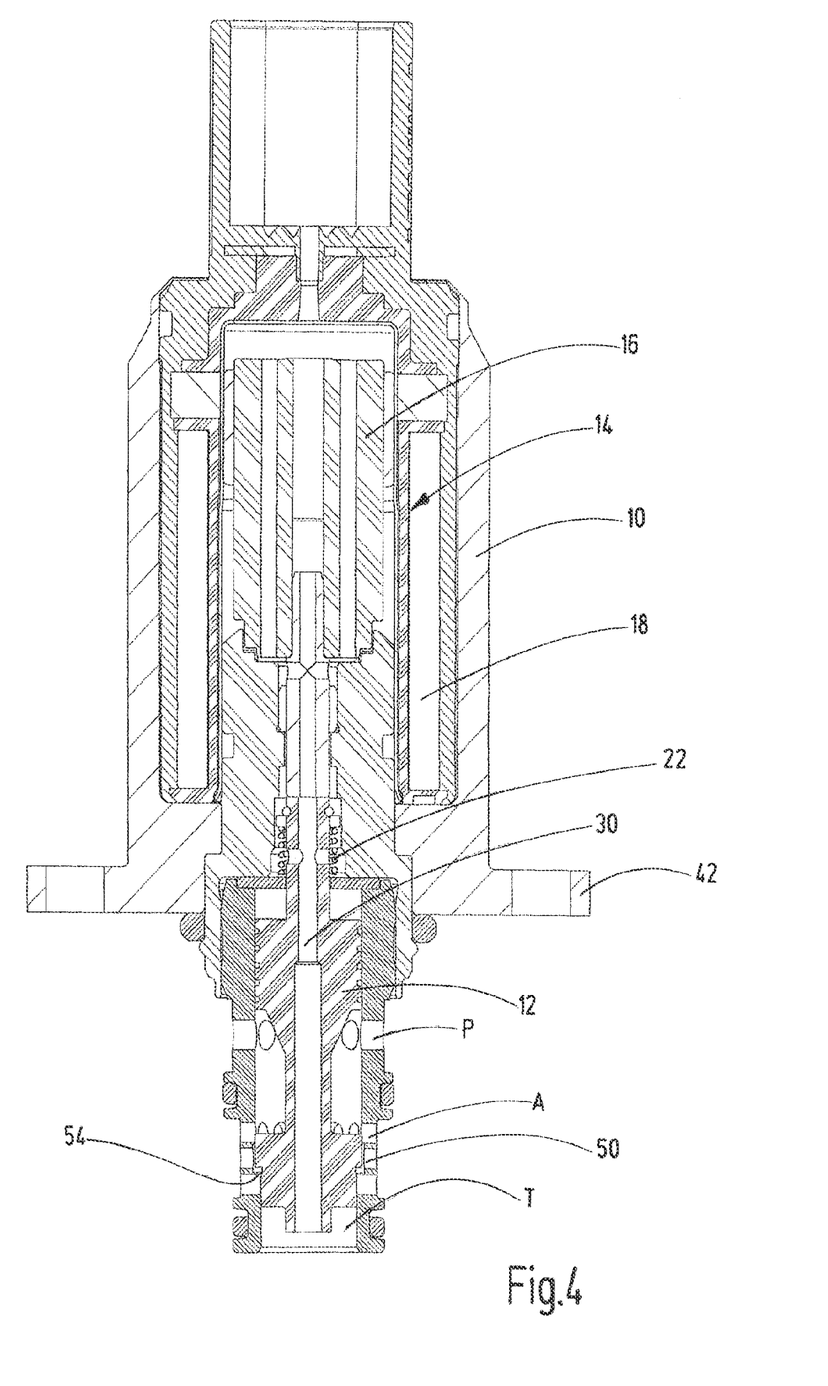

The valve solution according to the teachings herein as shown in FIGS. 2 to 4 will now be discussed insofar as it differs substantially from FIG. 1, the statements made so far also applying to the new valve solution and the same components being provided with the same reference numbers as in the solution according to FIG. 1.

FIG. 2 shows the valve according to the teachings herein in the form of a proportional pressure reducing valve in one of its control positions. In accordance with the valve solution according to FIG. 1, the valve according to the teachings herein also has a valve housing 10 and a valve piston 12, which is arranged therein so as to be longitudinally movable and which can be actuated by means of an actuating solenoid 14 to produce either a fluid-conducting connection between a pressure supply port P and a consumer port A or between this consumer port A and a return port T in the valve housing 10. The return or tank port T regularly leads to a fluid storage tank, whereas the pressure supply port is connected to a pressure supply source, such as a hydraulic pump; neither of which are shown. As further emerges from FIG. 2 and comparable to the prior art solution according to FIG. 1, the valve piston 12 is provided with the longitudinal drilled hole 36 so that the valve piston 12 is permanently connected to the return port T on its opposing end faces 44, 46 in a fluid-conducting manner and is therefore pressure balanced.

According to the illustration shown in FIG. 2, the top end face 46 of the valve piston 12 is in contact with an actuating rod 48 which can be controlled by the solenoid armature 16. For this purpose, the actuating solenoid 14 likewise has an energizable coil bobbin 18 and when the coil bobbin 18 is energised via a plug connector part 20, not shown in greater detail in FIGS. 2 to 4, the solenoid armature 16 moves downwards against the action of the compression spring 22. In the control position, at least a partial fluid-conducting connection is created between the pressure supply port P and the consumer port A, whereas the return port T is shut off by the valve piston 12. Thus, in the fully energised state of the actuating solenoid 14, the valve piston 12 assumes a switching position according to FIG. 4 in which there is full flow through the valve from the pressure supply port P to the consumer port A. In the de-energised state, however, the compression spring 22 returns the solenoid armature 16 to its maximum initial position in the upward direction of travel according to the illustration shown in FIG. 3 and a full flow of fluid is enabled between the consumer port A and the return port T.

As also emerges from FIGS. 2 to 4, the valve piston 12 has a pressure-active measuring surface 50 in the region of the consumer port A which forms a circumferential annular surface.

For the valve concept according to the teachings herein, it is particularly significant that the consumer port A consists of a plurality of rows of drilled holes 23, 25, 27 arranged one behind the other when viewed in the direction of travel of the valve piston 12, of which one row of drilled holes 23 serves to establish the fluid-conducting connection between the pressure supply port P and the consumer port A and a second row of drilled holes 25 serves to transfer the pressure from the consumer port A to the measuring surface 50 of the valve piston 12. The third row of drilled holes 27 is used in turn to establish a fluid-conducting connection between the consumer port A and the return port T (cf. FIG. 3). In principle, the middle row of drilled holes 25 needs only to consist of a single drilled hole, since it in this respect it only serves as a measuring port for transferring the pressure at the consumer port A to the annular measuring surface 50 on the valve piston 12.

However, to simplify production, it is also possible to equip all three rows of drilled holes 23, 25 and 27 with the same number of transverse drilled holes with the same drilled hole diameter.

At least when the actuating solenoid 14 is de-energised, the valve piston 12 assumes a position according to the illustration shown in FIG. 3 in which the two rows of adjacent drilled holes 23, 25 are in communication with each other in a fluid-conducting manner via a recess 52 in the valve piston 12, which forms the measuring surface 50 by forming a step, and the third row of drilled holes 27 located below is separated from the other two rows of said drilled holes 23, 25 by means of the valve piston 12 in the valve housing 10. As emerges in particular from FIG. 2, the transverse drilled holes of the top row of drilled holes 23 form a first control edge at this point with the valve piston 12; likewise the bottom row of drilled holes 27.

It is also particularly significant for the valve solution according to embodiments that, between the second 25 and third 27 row of drilled holes of the valve housing 10, there is a separating wall 54 which protrudes into the interior of the valve housing, the surface area of which corresponds to the size of the measuring surface 50 on the valve piston 12, and is for example larger by a slight amount. In this respect, the separating wall 54 forms a diaphragm-like ring-shaped surface and ensures in every travel position of the valve piston 12 that fluid cannot escape unintentionally from the row of drilled holes 25 into the lower row of drilled holes 27, so that in this respect it is always ensured that the fluid pressure present in the row of drilled holes 25 is permanently present, as the measuring pressure originating from consumer port A, at the measuring surface 50 of the valve piston 12.

As further emerges from FIGS. 2 to 4, the valve piston 12 is configured in a stepped manner due to a reduction in diameter on its side directed towards the return port T, with a first step 56 which has the measuring surface 50 and with a second step 58 merging into the first step 56, formed by a recess, the largest external diameter of which corresponds to the internal diameter of the separating wall 54 and to the internal diameter of the valve housing 10 at the location of the return port T. This second step 58 opens out on the underside of the valve piston 12 towards an annular extension 60 which protrudes towards the return port T; in this respect, extension 60 and step-shaped recess 58 form the lower end face 44 of the valve piston 12. For the fluid flow from consumer port A to return port T, the valve piston 12, as emerges from the illustration according to FIG. 3, forms a further control edge with the valve piston 12.

For the control to be explained in greater detail, it is significant that the effective pressure surfaces, in particular on the opposing end faces 44, 46 of the valve piston 12, differ by the annular surface which is formed by the first step 56 and consequently by the measuring surface 50. In accordance with the prior art, the valve solution according to the teachings herein also has a cylindrical, hollow-chamber-like recess 28 in the region of the pressure supply port P, into which the pressure supply port P discharges with its transverse drilled holes in each travel position of the valve piston 12. The end face boundaries of this recess 28 seen in the projection transverse to the direction of travel of the valve piston 12 have the same surface area in terms of pressure compensation. Overall, the valve design is characterised by a rotationally symmetrical structure.

As FIG. 2 in particular illustrates, the control pressure at the consumer port A thus acts against the annular measuring surface 50 on the valve piston 12 and causes an axial force which counteracts the magnetic force of the actuating solenoid 14. Thus, the control pressure can be changed proportionally depending on the magnetic force applied in each case.

Due to the fact that the pressure-active surfaces on the two end faces 44, 46 of the valve piston differ from each other, precisely by the annular surface at the change in diameter in the form of the first step 56 of the piston, which forms the measuring surface 50, the working pressure at the consumer port A can be converted at precisely this point into a force which counteracts the magnetic force of the actuating solenoid 14. In this respect, the valve according to the teachings herein can control the pressure proportionally because the pressure is always in balance with the magnetic force.

Accordingly, if the pressure is less than the magnetic force, the piston 12 moves downwards as viewed in the direction of FIGS. 2 to 4 and opens the flow of fluid from the pressure supply port P to the consumer port A, which is shown in FIG. 4. If the pressure is too high, the valve piston 12 moves upwards and in turn a flow of fluid is created from the consumer port A to the return port, which is the subject matter of the illustration according to FIG. 3.

The valve according to the teachings herein can also switch quickly during a cold start, due to the relatively large free flow cross-sections available between the valve piston 12 and the valve housing 10. Furthermore, the valve piston 12 can be significantly enlarged in diameter which considerably reduces the flow resistance for the oil, without increasing the valve installation space at the same time. This thus has no equivalent in prior art.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A valve, having a valve housing and a valve piston; wherein
    the valve piston is arranged in the valve housing so as to be longitudinally movable; wherein
    the valve piston can be actuated by an actuating solenoid to produce either a fluid-conducting connection between a pressure supply port and a consumer port or between the consumer port and a return port in the valve housing; wherein
    the valve piston is permanently connected to the return port at opposing end faces in a fluid-conducting manner; wherein the valve piston has a pressure-active measuring surface in the region of the consumer port;
    the pressure-active measuring surface provides the respective fluid pressure at the consumer port as a counterforce to the actuating force of the actuating solenoid when the actuating solenoid is energised in order to produce a fluid-conducting connection between the pressure supply port and the consumer port;
    the consumer port consists of a plurality of rows of drilled holes arranged one behind the other when viewed in the direction of travel of the valve piston;
    one row of drilled holes serves to establish the fluid-conducting connection between the pressure supply port and the consumer port and a second row of drilled holes serves to transfer the pressure from the consumer port to the measuring surface of the valve piston; and wherein
    a third row of drilled holes serves to establish a fluid-conducting connection between the consumer port and the return port.

2. The valve of claim 1, wherein, at least when the actuating solenoid is de-energised, the valve piston assumes a position, providing that the two rows of drilled holes are in communication with each other in a fluid-conducting manner via a recess in the valve piston, the recess forming the measuring surface, and the third row of drilled holes is separated from the two rows of drilled holes by the valve piston in the valve housing.

3. The valve of claim 1, wherein, between the second and third row of drilled holes of the valve housing, a separating wall is arranged, wherein the separating wall protrudes into the interior of the valve housing, wherein the size of the separating wall corresponds to the size of the measuring surface on the valve piston.

4. The valve of claim 1, wherein the valve piston is configured in a stepped manner on a side directed towards the return port, with a first step comprising the measuring surface and with a second step merging into the first step, formed by a recess, a largest external diameter of the second step corresponding to an internal diameter of a separating wall and to an internal diameter of the valve housing at the location of the return port.

5. The valve of claim 1, wherein, when the actuating solenoid is de-energised, the valve piston establishes a fluid-conducting connection between the consumer port and the return port.

6. The valve of claim 1, wherein diameters of all the drilled holes of all the rows of drilled holes are identical.

7. The valve of claim 1, wherein effective pressure surfaces on the opposing end faces of the valve piston differ by an annular surface, wherein the annular surface is formed by a first step with the measuring surface.

8. The valve of claim 1, wherein an energy accumulator, in the form of a compression spring is supported with one end on the valve piston and with is-another end on parts of the valve housing, and serves to return the valve piston to a starting position when the actuating solenoid is de-energised.

9. The valve of claim 1, wherein the valve is a proportional pressure-reducing valve.

10. The valve of claim 2, wherein, between the second and third row of drilled holes of the valve housing, a separating wall is arranged, wherein the separating wall protrudes into the interior of the valve housing, wherein the size of the separating wall corresponds to the size of the measuring surface on the valve piston.

11. The valve of claim 2, wherein the valve piston is configured in a stepped manner on a side directed towards the return port, with a first step comprising the measuring surface and with a second step merging into the first step, formed by a recess, a largest external diameter of the second step corresponding to an internal diameter of a separating wall and to an internal diameter of the valve housing at the location of the return port.

12. The valve of claim 3, wherein the valve piston is configured in a stepped manner on a side directed towards the return port, with a first step comprising the measuring surface and with a second step merging into the first step, formed by a recess, a largest external diameter of the second step corresponding to an internal diameter of a separating wall and to an internal diameter of the valve housing at the location of the return port.

13. A valve, having a valve housing and a valve piston; wherein
- the valve piston is arranged in the valve housing so as to be longitudinally movable; wherein
- the valve piston can be actuated by an actuating solenoid to produce either a fluid-conducting connection between a pressure supply port and a consumer port or between the consumer port and a return port in the valve housing; wherein
- the valve piston is permanently connected to the return port at opposing end faces in a fluid-conducting manner; wherein the valve piston has a pressure-active measuring surface in the region of the consumer port;
- the pressure-active measuring surface provides the respective fluid pressure at the consumer port as a counterforce to the actuating force of the actuating solenoid when the actuating solenoid is energised in order to produce a fluid-conducting connection between the pressure supply port and the consumer port;
- the consumer port consists of a plurality of rows of drilled holes arranged one behind the other when viewed in the direction of travel of the valve piston;
- one row of drilled holes serves to establish the fluid-conducting connection between the pressure supply port and the consumer port and a second row of drilled holes serves to transfer the pressure from the consumer port to the measuring surface of the valve piston; and wherein
- at least when the actuating solenoid is de-energised, the valve piston assumes a position, providing that the two rows of drilled holes are in communication with each other in a fluid-conducting manner via a recess in the valve piston, the recess forming the measuring surface, and a third row of drilled holes is separated from the two rows of drilled holes by the valve piston in the valve housing.

14. The valve of claim 13, wherein the valve piston is configured in a stepped manner on a side directed towards the return port, with a first step comprising the measuring surface and with a second step merging into the first step, formed by a recess, a largest external diameter of the second step corresponding to an internal diameter of a separating wall and to an internal diameter of the valve housing at the location of the return port.

15. The valve of claim 13, wherein, between the second and third row of drilled holes of the valve housing, a separating wall is arranged, wherein the separating wall protrudes into the interior of the valve housing, wherein the size of the separating wall corresponds to the size of the measuring surface on the valve piston.

16. A valve, having a valve housing and a valve piston; wherein
- the valve piston is arranged in the valve housing so as to be longitudinally movable; wherein
- the valve piston can be actuated by an actuating solenoid to produce either a fluid-conducting connection between a pressure supply port and a consumer port or between the consumer port and a return port in the valve housing;
- the valve piston is permanently connected to the return port at opposing end faces in a fluid-conducting manner; wherein the valve piston has a pressure-active measuring surface in the region of the consumer port;
- the pressure-active measuring surface provides the respective fluid pressure at the consumer port as a counterforce to the actuating force of the actuating solenoid when the actuating solenoid is energised in order to produce a fluid-conducting connection between the pressure supply port and the consumer port; and wherein
- the valve piston is configured in a stepped manner on a side directed towards the return port, with a first step comprising the measuring surface and with a second step merging into the first step, formed by a recess, a largest external diameter of the second step corresponding to an internal diameter of a separating wall and to an internal diameter of the valve housing at the location of the return port.

17. The valve of claim 16, wherein the consumer port consists of a plurality of rows of drilled holes arranged one behind the other when viewed in the direction of travel of the valve piston; one row of drilled holes serves to establish the fluid-conducting connection between the pressure supply port and the consumer port and a second row of drilled holes serves to transfer the pressure from the consumer port to the measuring surface of the valve piston.

18. The valve of claim 16, wherein a third row of drilled holes serves to establish a fluid-conducting connection between the consumer port and the return port.

* * * * *